(12) United States Patent
Nasca et al.

(10) Patent No.: US 11,535,162 B1
(45) Date of Patent: Dec. 27, 2022

(54) DEVICE AND METHOD FOR FLEXIBLE FASCIA PROTECTION, CARGO RETENTION, FLOOR PROTECTION AND STORAGE UNIT

(71) Applicant: GM Global Technology Operations LLC, Detroit, MI (US)

(72) Inventors: Jeff E. Nasca, Bloomfield Township, MI (US); Humberto Ortiz, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/488,653

(22) Filed: Sep. 29, 2021

(51) Int. Cl.
*B60R 5/02* (2006.01)
*B60R 13/01* (2006.01)

(52) U.S. Cl.
CPC .............. *B60R 5/02* (2013.01); *B60R 13/011* (2013.01); *B60R 13/013* (2013.01)

(58) Field of Classification Search
CPC ..... B60J 11/00; B60P 7/02; B60P 7/04; B60P 7/0807; B60R 5/02; B60R 5/04; B60R 5/044; B60R 13/01; B60R 13/011
USPC ................................................ 296/37.1, 37.6
See application file for complete search history.

(56) References Cited

U.S. PATENT DOCUMENTS

| | | | | |
|---|---|---|---|---|
| 2,911,253 A * | 11/1959 | Dewey | ................... | B60R 13/01 296/39.1 |
| 5,121,958 A * | 6/1992 | Goeden | ................... | B60R 7/005 296/37.16 |
| 5,893,597 A * | 4/1999 | Rider | ..................... | B60R 9/00 296/37.6 |
| 6,435,586 B2 * | 8/2002 | Getzschman | ............ | B60R 9/00 224/543 |
| 6,663,156 B1 * | 12/2003 | Kincaid | ..................... | B60R 5/04 296/97.23 |
| 6,880,879 B2 * | 4/2005 | Pickard | ................... | B60R 13/01 296/136.01 |
| 7,219,944 B2 * | 5/2007 | Klotz | ........................ | B60R 5/04 105/423 |
| 7,318,617 B1 * | 1/2008 | Scotton | .................. | B60R 5/045 224/567 |
| 10,682,962 B2 * | 6/2020 | Davidson-Chmielewski | ............. | B60R 5/045 |
| 2006/0289581 A1 * | 12/2006 | Bohlke | .................. | B60R 13/01 224/543 |
| 2022/0212610 A1 * | 7/2022 | Stevens | ..................... | B60P 3/04 |

* cited by examiner

*Primary Examiner* — Jason S Daniels
(74) *Attorney, Agent, or Firm* — Vivacqua Crane PLLC (57) ABSTRACT

A vehicle cargo mat system includes a cargo mat configured to fit within an automobile vehicle storage area. Multiple retention members are connected to the cargo mat and are adapted to individually releasably connect to one of multiple attachment members fixed to the automobile vehicle within the storage area. The cargo mat is further configured to extend into at least four optional positions including: a first position extending across a width of the storage area at an outward facing end of the storage area; a second position having the cargo mat laid flat to substantially cover a lower floor of the storage area; a third position having the cargo mat extended over the storage area to cover objects temporarily stored within the storage area; and a fourth position having the cargo mat extended outward from the storage area to at least partially cover a fascia of the automobile vehicle.

20 Claims, 8 Drawing Sheets

DEVICE AND METHOD FOR FLEXIBLE FASCIA PROTECTION, CARGO RETENTION, FLOOR PROTECTION AND STORAGE UNIT

INTRODUCTION

The present disclosure relates to frunk and trunk space protective systems for automobile vehicles.

In automobile vehicle frunk and trunk spaces, a cover, a separate hold-down device and a protective cargo mat may be separately provided, which are commonly limited to single use and single location, such as the frunk or the trunk. As the devices are independently purchased and used, they may be separated from each other and may be lost or misplaced prior to use. They also require independent installation which is cumbersome and time consuming for the vehicle user to use.

Thus, while current automobile vehicle frunk and trunk system covers, separate hold-down devices and protective cargo mats achieve their intended purpose, there is a need for a new and improved multi-functional trunk and frunk and trunk system cover, separate hold-down device and protective cargo mat.

SUMMARY

According to several aspects, a vehicle cargo mat system includes a cargo mat configured to fit within a storage area of an automobile vehicle. Multiple retention members are connected to the cargo mat, the multiple retention members adapted to individually releasably connect to one of multiple attachment members fixed to the automobile vehicle within the storage area. The releasable connections may also be connected outside of a frunk/trunk rear cargo area onto an exterior body. The cargo mat is further configured to extend into at least four optional positions including: a first position extending across a width of the storage area at an outward facing end of the storage area; a second position having the cargo mat laid flat to substantially cover a lower floor of the storage area; a third position having the cargo mat extended over the storage area to cover objects temporarily stored within the storage area; and a fourth position having the cargo mat extended outward from the storage area to at least partially cover a fascia of the automobile vehicle.

In another aspect of the present disclosure, the multiple attachment members include a first attachment member, a second attachment member elevated above the first attachment member, a third attachment member horizontally opposed to the first attachment member, and a fourth attachment member horizontally opposed to the second attachment member proximate an outward facing end of the storage area.

In another aspect of the present disclosure, the cargo mat when in the first position is configured as a vertical wall positioned proximate to the outward facing end of the storage area and releasably connected to the first attachment member, the second attachment member, the third attachment member, and the fourth attachment member.

In another aspect of the present disclosure, the multiple attachment members further include a fifth attachment member and a sixth attachment member proximate a closed end of the storage space defining an opposite end of the storage area from the first attachment member, the second attachment member, the third attachment member and the fourth attachment member.

In another aspect of the present disclosure, the cargo mat when in the third position has the cargo mat is releasably connected to the first attachment member and the third attachment member, is extended over the storage area and is releasably connected to the fifth attachment member and the sixth attachment member.

In another aspect of the present disclosure, a pouch has the cargo mat positioned within the pouch when the cargo mat is in the first position.

In another aspect of the present disclosure, the cargo mat defines an accordion shape folded to fit within the pouch and extended out of the pouch to extend to one of the second position, the third position or the fourth position.

In another aspect of the present disclosure, the attachment members define one of: fixed hooks and rings including D-shaped rings.

In another aspect of the present disclosure, the storage area defines one of a front storage area also defining a frunk, and a rear storage area also defining a trunk.

In another aspect of the present disclosure, the retention members define bungee hooks allowing flexible extension of the retention members to bias the cargo mat.

According to several aspects, a flexible fascia protection, cargo retention, floor protection and storage system includes a cargo mat of a flexible material configured to fit within a front storage area of an automobile vehicle. Multiple retention members are connected to the cargo mat. The multiple retention members are adapted to individually releasably connect to one of multiple attachment members fixed to the automobile vehicle within the front storage area. The cargo mat when releasably connected to at least two of the attachment members is further configured into at least four optional positions including: a first position defining a vertical wall extending across a width of the storage area proximate an outward facing end of the storage area; a second position having the cargo mat laid flat to substantially cover a lower floor of the storage area; a third position having the cargo mat extended over the storage area to cover objects temporarily stored within the storage area; and a fourth position having the cargo mat extended outward from the storage area to at least partially cover a fascia of the automobile vehicle.

In another aspect of the present disclosure, a pouch is included, wherein the cargo mat defines an accordion shape folded to fit within the pouch, the pouch defining the vertical wall with the cargo mat extended out of the pouch to achieve to one of the second position, the third position or the fourth position.

In another aspect of the present disclosure, the cargo mat includes multiple permanent flat segments separated by successive folding sections defining hinged joints.

In another aspect of the present disclosure, the at least two of the multiple attachment members includes a first attachment member, a second attachment member elevated above the first attachment member, a third attachment member horizontally opposed to the first attachment member, and a fourth attachment member horizontally opposed to the second attachment member.

In another aspect of the present disclosure, the pouch includes a retention member connected to the pouch at each of four corners of the pouch. The retention member at each of the four corners is individually releasably connected to one of the first attachment member, the second attachment member, the third attachment member and the fourth attachment member such that the vertical wall extends across a width of the forward storage area proximate an outward facing end of the forward storage area.

In another aspect of the present disclosure, predetermined ones of the retention members define bungee members releasably connected into openings created in the fascia, elastic displacement of the bungee members inducing tension to retain the cargo mat in the fourth position.

In another aspect of the present disclosure, a reel has the cargo mat biased to be retracted into the reel and retractably extended from the reel to provide the second position, the third position and the fourth position.

According to several aspects, a method to provide fascia protection, cargo retention, floor protection and storage for an automobile vehicle includes: configuring a cargo mat to fit entirely within a storage area of the automobile vehicle; connecting multiple retention members to the cargo mat; fixing multiple attachment members to the automobile vehicle to be accessible within the storage area; releasably connecting individual ones of the multiple retention members to predetermined ones of the multiple attachment members; and providing for at least four optional positions of the cargo mat including: a first position having the cargo mat extending as a vertical wall across a width of the storage area at an outward facing end of the storage area; a second position having the cargo mat laid flat to substantially cover a lower floor of the storage area; a third position having the cargo mat reaching over the storage area to cover or retain objects temporarily stored within the storage area; and a fourth position having the cargo mat extended outward from the storage area to at least partially cover a fascia of the automobile vehicle.

In another aspect of the present disclosure, the method further includes releasably connecting a same two of the retention members to a same two of the predetermined ones of the multiple attachment members in each of the first position, the second position, the third position and the fourth position of the cargo mat.

In another aspect of the present disclosure, the method further includes configuring the storage area as one of a frunk area and a trunk area of the automobile vehicle with the cargo mat adapted to interchangeably fit within the frunk area and the trunk area.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
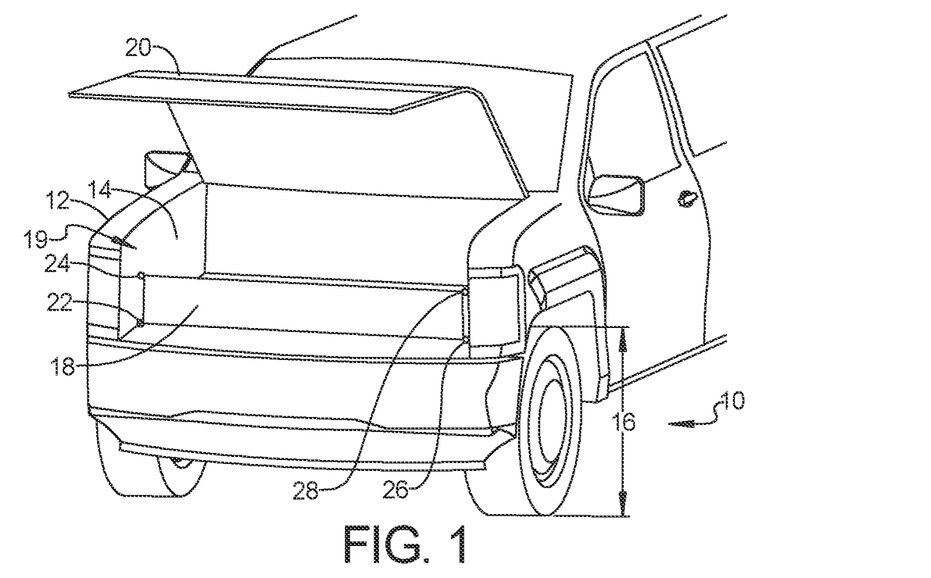
FIG. 1 is a front left perspective view of an automobile vehicle having a flexible fascia protection, cargo retention, floor protection and storage system showing a cargo mat and a storage pouch acting as a storage and item retention member in a first configuration according to an exemplary aspect.

Referring to FIG. 1, a flexible fascia protection, cargo retention, floor protection and storage system 10 is provided for an automobile vehicle 12 such as a sport utility vehicle having a front storage area 14 or frunk. Due to a height 16 of wheels used to generate ground clearance for the automobile vehicle 12, and because items temporarily stored within the front storage area 14 may move about during vehicle travel it is desirable to provide a cargo mat 18 sized to fit within the front storage area 14. The cargo mat 18 may be made of a flexible material such as a polymeric material or a rubber-based material. The cargo mat 18 provides multiple functions when installed in one of multiple different positions within or adjacent to the front storage area 14.

According to a first aspect, the cargo mat 18 in a first installation configuration is releasably positioned to span across a forward or outward facing end 19 of the front storage area 14. The forward end of the front storage area 14 defines the "outward facing" end 19 when a front hood 20 is opened thereby allowing access into the front storage area 14 for installation or removal of storage items. In the first installation configuration shown, the cargo mat 18 provides a vertical wall to mitigate against items within the front storage area 14 from falling out through the outward facing end 19 of the front storage area when the front hood 20 is opened. The cargo mat 18 is held in a vertical wall orientation by releasably attaching the cargo mat 18 to a first attachment member 22, a second attachment member 24 elevated above the first attachment member 22, a third attachment member 26 horizontally opposed to the first attachment member 22, and a fourth attachment member 28 horizontally opposed to the second attachment member 24. According to several aspects, the attachment members may be but are not limited to movable or fixed hooks, or rings such as D-shaped rings which are fixed to the automobile vehicle 12 within the front storage area 14. According to several aspects, the cargo mat 18 may be retained by connection using only two of the attachment members, for example using the second attachment member 24 and the fourth attachment member 28.

Referring to FIG. 2 and again to FIG. 1, according to a second aspect, the cargo mat 18 in a second configuration is unfolded or extended from the vertical wall configuration described in reference to FIG. 1, retained by continued connection to the first attachment member 22 and the third attachment member 26, and extended flat in a rearward direction within the front storage area 14 to substantially cover a lower floor 30 of the front storage area 14. According to several aspects, the floor mat 18 may also be releasable fixed to compartment rear connections such as a fifth attachment member 32 and a sixth attachment member (not clearly visible in this view) connected to structure of the automobile vehicle 12. In the second configuration the cargo mat 18 provides a protective and releasable cover for the lower floor 30, allowing cargo items such as construction materials including but not limited to lumber, mulch, hardware items, tools, and the like, as well as groceries to be loaded into the front storage area 14 during any weather condition while protecting the lower floor 30. By subsequent release and removal of the cargo mat 18 the cargo mat 18 may be cleaned of any debris, dirt, or other items and reinstalled for additional use.

Figure 2:
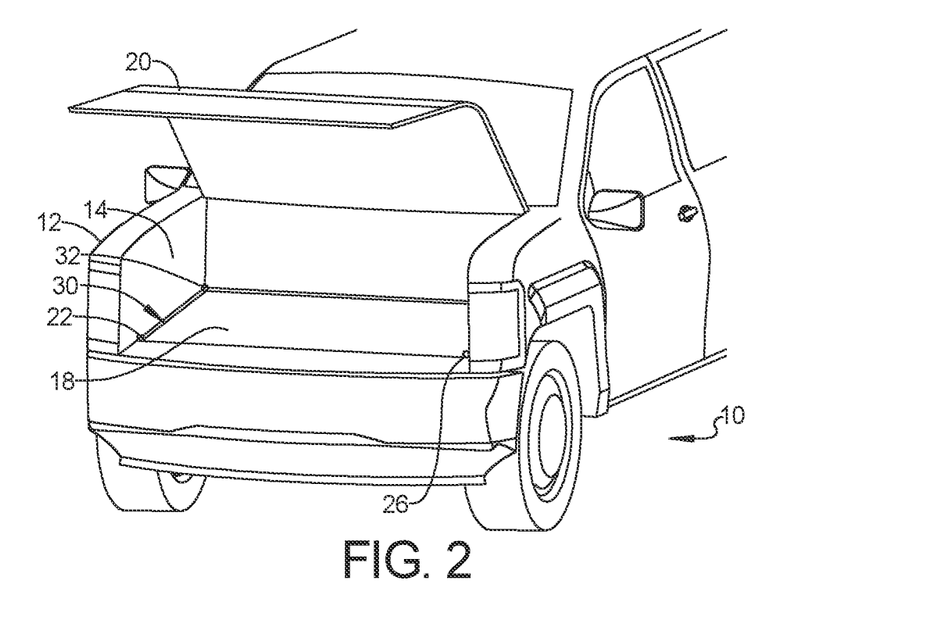
FIG. 2 is a front left perspective view of the automobile vehicle of FIG. 1 showing the cargo mat in a second configuration.

Referring to FIG. 3 and again to FIGS. 1 and 2, according to a third aspect, one or more items may be stowed within the front storage area 14, and the cargo mat 18 in a third configuration is positioned above the stowed items to retain the stowed items during transfer and when the front hood 20 is opened. In the third configuration the cargo mat 18 is releasably retained at the outward facing end 19 by releasably connecting the cargo mat 18 to the first attachment member 22 and the third attachment member 26, and by releasably connecting a rearwardly facing end of the cargo mat to a first upper rear attachment member 34 and a second upper rear attachment member 36 horizontally opposed to the first upper rear attachment member 34. The first upper rear attachment member 34 and the second upper rear attachment member 36 are positioned proximate a "closed" end 37 of the front storage area 14 opposite to the outward facing end 19 which is not accessible for installation or removal of stowage items. Stowage items covered by the cargo mat 18 may be removed by releasing the cargo mat 18 from either the first attachment member 22 and the third attachment member 26, or by releasing the cargo mat 18 from the first upper rear attachment member 34 and the second upper rear attachment member 36. It is noted the items covered by the cargo mat 18 in the third configuration are protected from environmental conditions such as rain or snow when the hood 20 is lifted.

Figure 3:
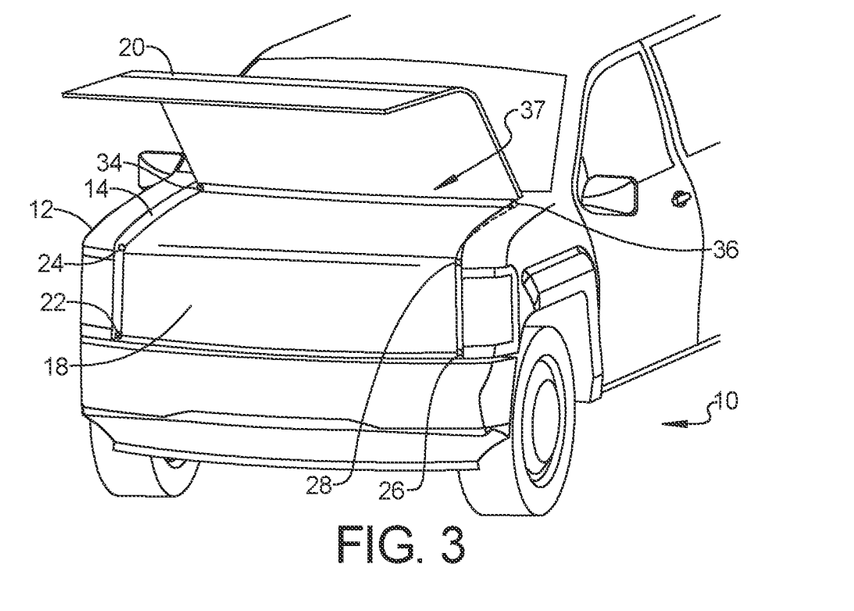
FIG. 3 is a front left perspective view of the automobile vehicle of FIG. 1 showing the cargo mat in a third configuration.

Referring to FIG. 4 and again to FIGS. 1 through 3, according to a fourth aspect, the cargo mat 18 may be positioned in a fourth configuration to provide a barrier between a vehicle user and a front fascia 38 of the automobile vehicle 12. The fourth configuration of the cargo mat 18 allows the vehicle user when the hood 20 is lifted to access the front storage area 14 and to load items into or remove items from the front storage area 14. In the fourth configuration the cargo mat 18 is releasably retained to extend over the front fascia 38 by releasably connecting the cargo mat 18 to the first attachment member 22 and the third attachment member 26, and by allowing the cargo mat 18 to overlap in a direction frontward of the first attachment member 22 and the third attachment member 26 onto the front fascia 38. In the fourth configuration the cargo mat 18 mitigates against dirt, mud, grease or the like on the front fascia 38 from contacting clothing of the vehicle user, and further mitigates against the vehicle user directly contacting the front fascia 38 or directly contacting the front fascia with an item during item load or unload and thereby damaging or defacing the front fascia 38.

Referring to FIG. 5 and again to FIGS. 1 through 4, the cargo mat 18 is shown in phantom zones representing each of the above four described first, second, third and fourth configurations. A zone A shows the cargo mat 18 in the first configuration defining the vertical wall. A zone B shows the cargo mat 18 in the second configuration extended flat in a rearward direction within the front storage area 14 to substantially cover the lower floor 30 of the front storage area 14. A zone C shows the cargo mat 18 in the third configuration also extended in the rearward direction 40 and releasably connected to the first attachment member 22 and the third attachment member 26 as well as releasably connected to the first upper rear attachment member 34 and the second upper rear attachment member 36. A zone D shows the cargo mat 18 in the fourth configuration releasably connected to the first attachment member 22 and the third attachment member 26 and extended in a forward direction 42 to overlap onto the front fascia 38. In each of the zones including the zone A, the zone B, the zone C and the zone D, the cargo mat 18 extends substantially entirely across the lower floor 30 of the front storage area 14.

Figure 6:
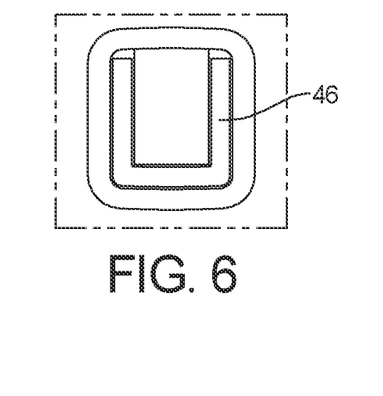
FIG. 6 is a front elevational view of a D-shaped attachment member of the present disclosure.

Referring to FIG. 6, an attachment feature such as a D-ring 46 or a similar device is shown as an exemplary one of the attachment members which are fixed to structure of the automobile vehicle 12. The D-ring 46 in the stowed position shown rotates downward to minimize extension of the D-ring 46 into the front storage area 14 of the automobile vehicle 12.

Figure 7:
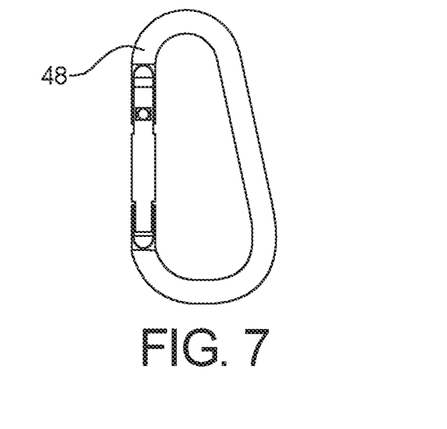
FIG. 7 is a front elevational view of a carabiner attachment member of the present disclosure.

Referring to FIG. 7, a carabiner 48 is shown as another exemplary one of the attachment members which are fixed to structure of the automobile vehicle 12.

Figure 8:
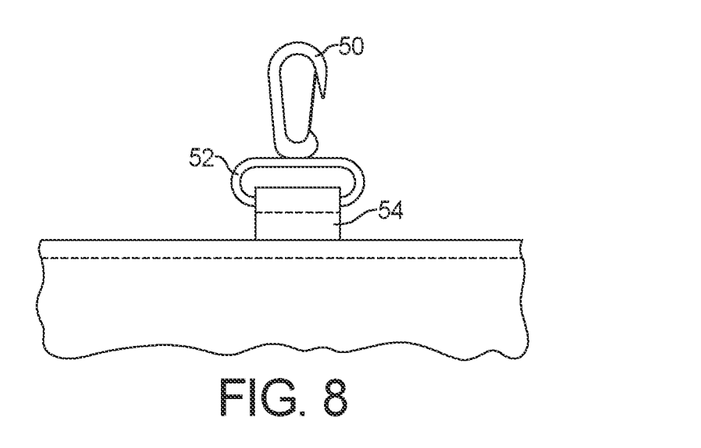
FIG. 8 is a front elevational view of a snap-clip retention member of the present disclosure.

Referring to FIG. 8, the cargo mat 18 is provided with multiple retention members which provide for releasable connection of the cargo mat 18 to one of the multiple attachment members described above which are fixed to structure of the automobile vehicle 12. A rotating snap clip 50 provides an exemplary one of the retention members which are connected for example by stitching or riveting to the cargo mat 18. The rotating snap clip 50 may be connected by a metal loop 52 to a polymeric material belt which may be fixed for example by stitching or riveting to the cargo mat 18.

Figure 9:
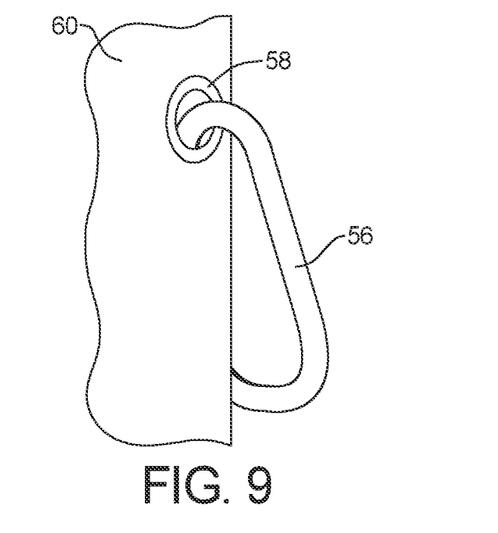
FIG. 9 is a perspective view of a carabiner retention member of the present disclosure.

Referring to FIG. 9, a carabiner clip 56 is shown as another exemplary one of the retention members attached to the cargo mat 18. The carabiner clip 56 may be connected through a metal ring 58 to a polymeric material portion 60 of the cargo mat 18.

Figure 10:
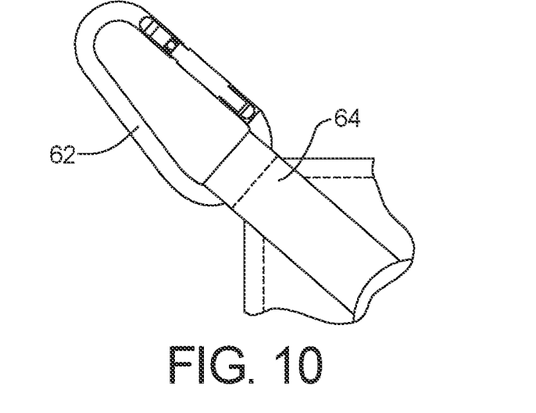
FIG. 10 is a front elevational view of a carabiner with a strap attachment of the present disclosure.

Referring to FIG. 10, a carabiner clip 62 is shown as another exemplary one of the retention members attached to the cargo mat 18. The carabiner clip 62 may be connected through a polymeric material strap 64 to a polymeric material portion of the cargo mat 18 for example by stitching or riveting. The polymeric material strap 64 allows flexibility for the carabiner clip 62 to displace during connection to one of the attachment members fixed to the automobile vehicle 12.

Referring to FIG. 11 and again to FIGS. 1 and 3, according to several aspects a cargo mat 66 may be used in place of the cargo mat 18. Cargo mat 66 defines an accordion-shaped mat to allow individual segments to be folded for laying flat and retained for expanding through use of attachments such as magnets for storage into a pouch 68 or a cartridge. The pouch 68 is provided with retention clips including a first retention clip 70 which is releasably connected to the second attachment member 24, a second retention clip 72 which is releasably connected to the first attachment member 22, a third retention clip 74 which is releasably connected to the fourth attachment member 28, and a fourth retention clip 76 which is releasably connected to the third attachment member 26. When the retention members or clips of the pouch 68 are engaged with the attachment members the pouch 68 provides the structure for the vertical wall described in reference to FIG. 1.

Figure 11:
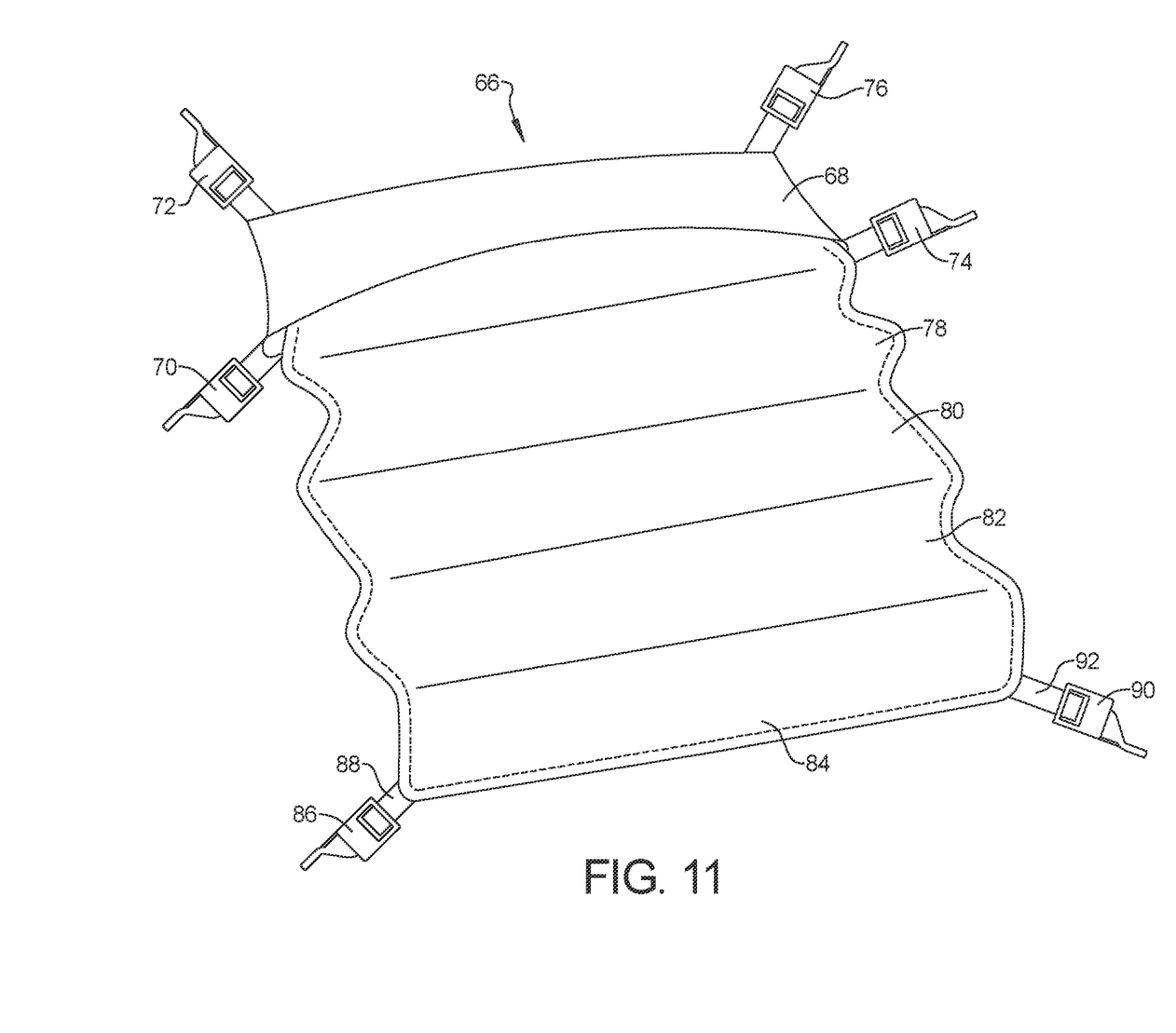
FIG. 11 is a front perspective view of an accordion-shaped cargo mat of the present disclosure.

According to several aspects, the pouch 68 and the cargo mat 66 include a body 78 made of a polymeric material including vinyl or may be made of a rubber-like material to provide for example up to a 6-way flexibility for the cargo mat 66. A reverse or backside of the material may be made or added to a main body of a soft material to provide coverage of coverage items and to protect an exterior fascia against damage. According to several aspects, the pouch 68 may be provided with a closure device such as a zipper, hook-and-loop closure members, clips or the like to positively and releasably close the pouch 68 with the cargo mat 66 stored within the pouch 68. The cargo mat 66 may therefore include multiple permanent flat segments such as a first flat segment 80 with successive folding sections defining hinged joints such as a first folding section 82. A free end 84 may be extended into the front storage area 14 as described in reference to FIG. 2 and may also include retention clips to releasably connect the free end 84 to the first upper rear attachment member 34 and to the second upper rear attachment member 36 as described in reference to FIG. 3. For this purpose, the free end 84 may also include a fifth retention clip 86 fixed for example by stitching to a flexible band 88 connected to a first corner of the free end 84. The free end 84 may also include a sixth retention clip 90 opposed to the fifth retention clip 86 and fixed for example by stitching to a flexible band 92 connected to a second corner of the free end 84.

Referring to FIG. 12 and again to FIGS. 1 through 4, according to several aspects a cargo mat 94 is modified from cargo mat 18 to be releasably dispensed from a reel 96. The reel 96 is fixed in position in the front storage area 14 and to use the cargo mat 94 a free end 98 of the cargo mat 94 is pulled away from the reel 96. A spring force returns the free end 98 into the reel 96 for stowage of the cargo mat 94. One or more retention members as described above with respect to FIGS. 8 through 10 may be added to the cargo mat 94 to allow releasably fixing the cargo mat 94.

Figure 4:
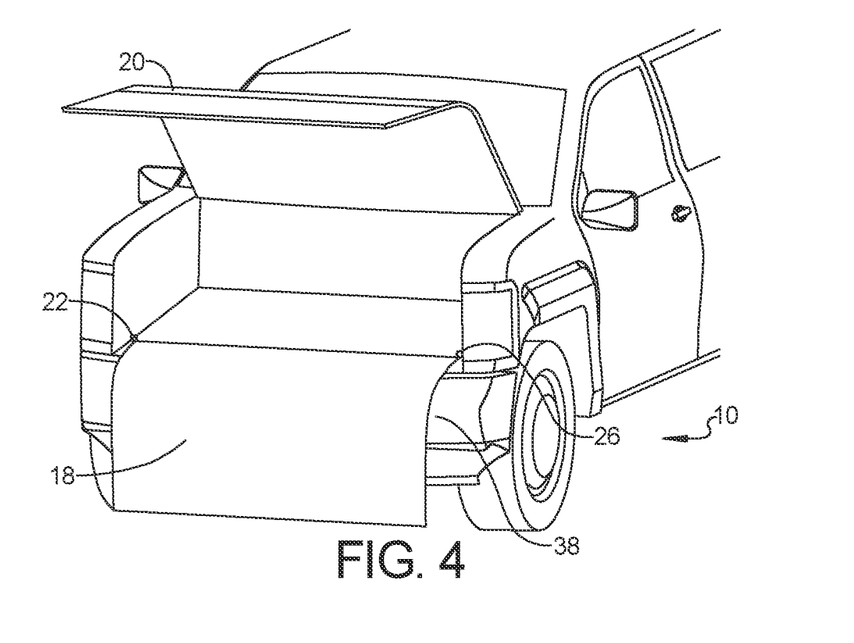
FIG. 4 is a front left perspective view of the automobile vehicle of FIG. 1 showing the cargo mat in a fourth configuration.
Figure 5:
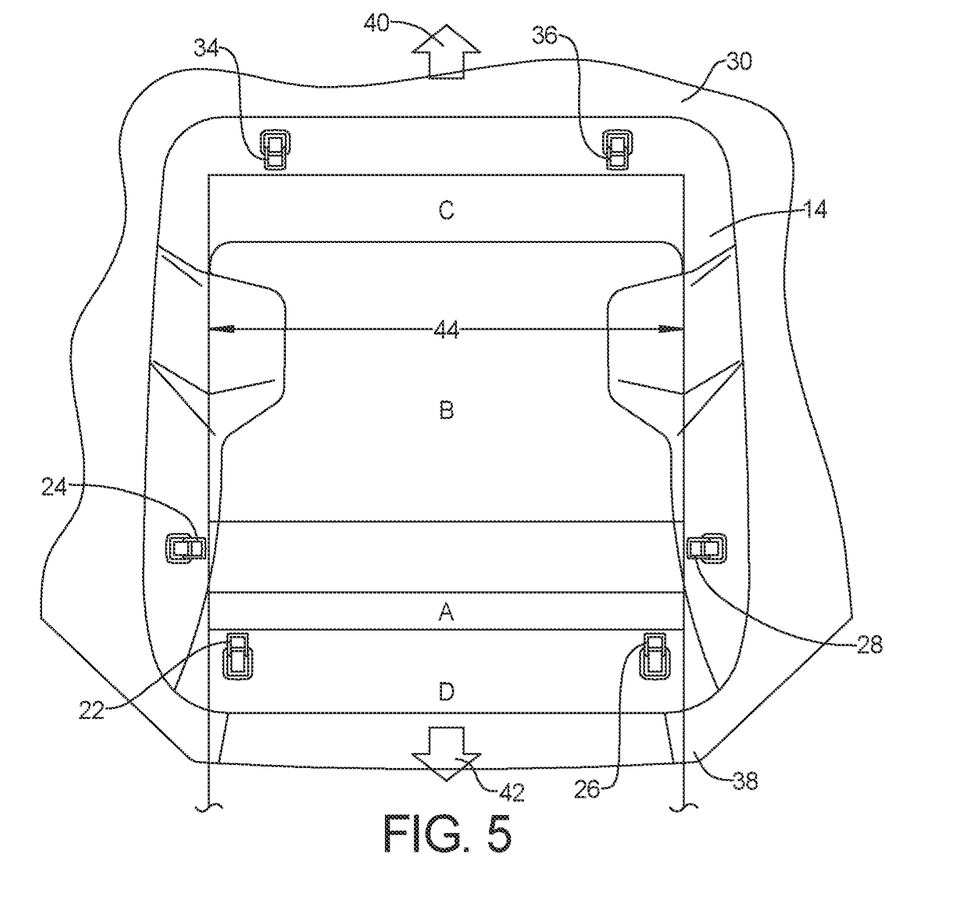
FIG. 5 is a top plan view of the system of FIG. 1.

Referring to FIG. 13 and again to FIG. 4, to provide for maximum extension and retention of the cargo mat 18 in the deployed position over the front fascia 38, flexible, rubber-like retention connectors may be used. According to several aspects, a first bungee hook 100 is connected to a first corner of the cargo mat 18 and a second bungee hook 102 is oppositely positioned with respect to the first bungee hook 100 at a second corner of the cargo mat 18. The bungee hooks are made of a flexible and stretchable material which when elastically extended allows the corners of the cargo mat 18 to be placed in tension to hold the cargo mat 18 in the extended position.

Figure 13:
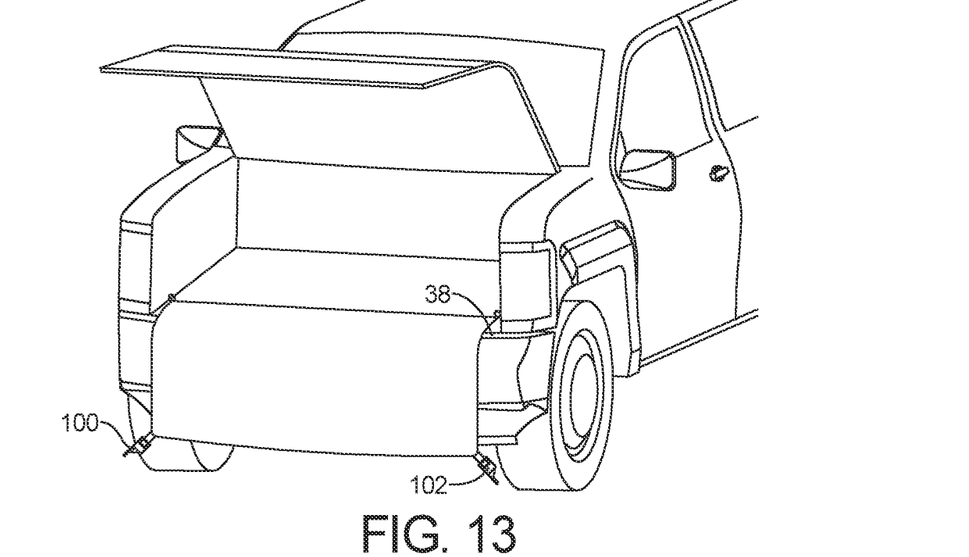
FIG. 13 is a front left perspective view similar to FIG. 4 modified to present bungee hook attachments for the cargo mat.
Figure 14:
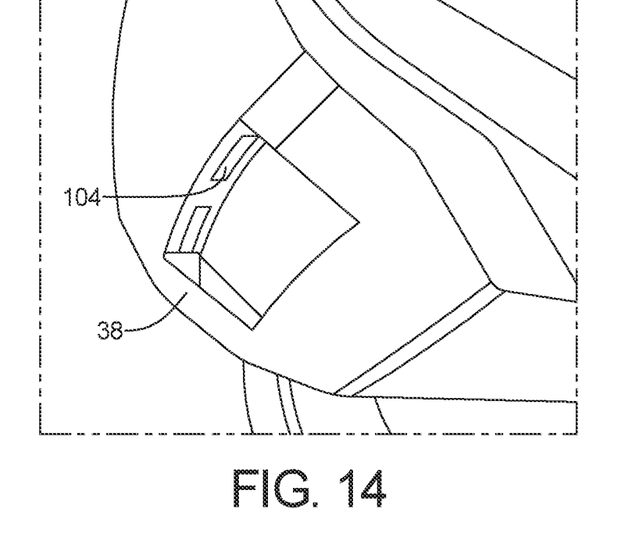
FIG. 14 is a front left perspective view looking upward showing an underside of a front fascia of the automobile vehicle of FIG. 1.

Referring to FIG. 14 and again to FIGS. 4 and 13, one or more openings 104 are provided in the front fascia 38. The hooks such as the first bungee hook 100 and the second bungee hook 102 may be releasably connected to one of the multiple openings 104 to releasably retain the cargo mat 18.

Figure 12:
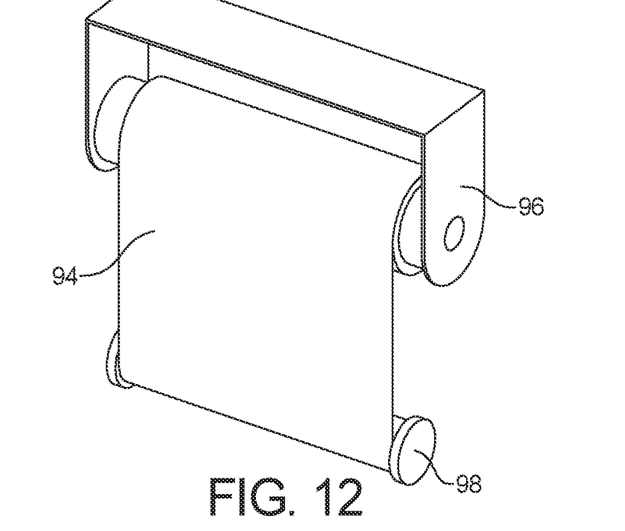
FIG. 12 is a front left perspective view of a reel operated cargo mat of the present disclosure.
Figure 15:
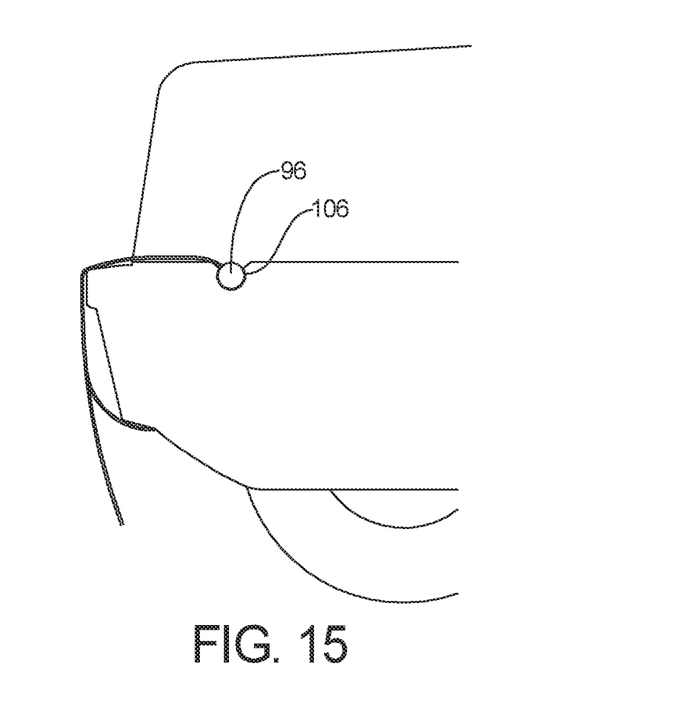
FIG. 15 is a partial cross sectional side elevational view of the automobile vehicle of FIG. 4.

Referring to FIG. 15 and again to FIG. 12, a recess or cavity 106 may be provided within the lower floor 30 of the front storage area 14. The reel 96 may be releasably or permanently positioned either partially or completely within the cavity 106 to minimize a space occupied by the reel 96 within the front storage area 14.

Figure 16:
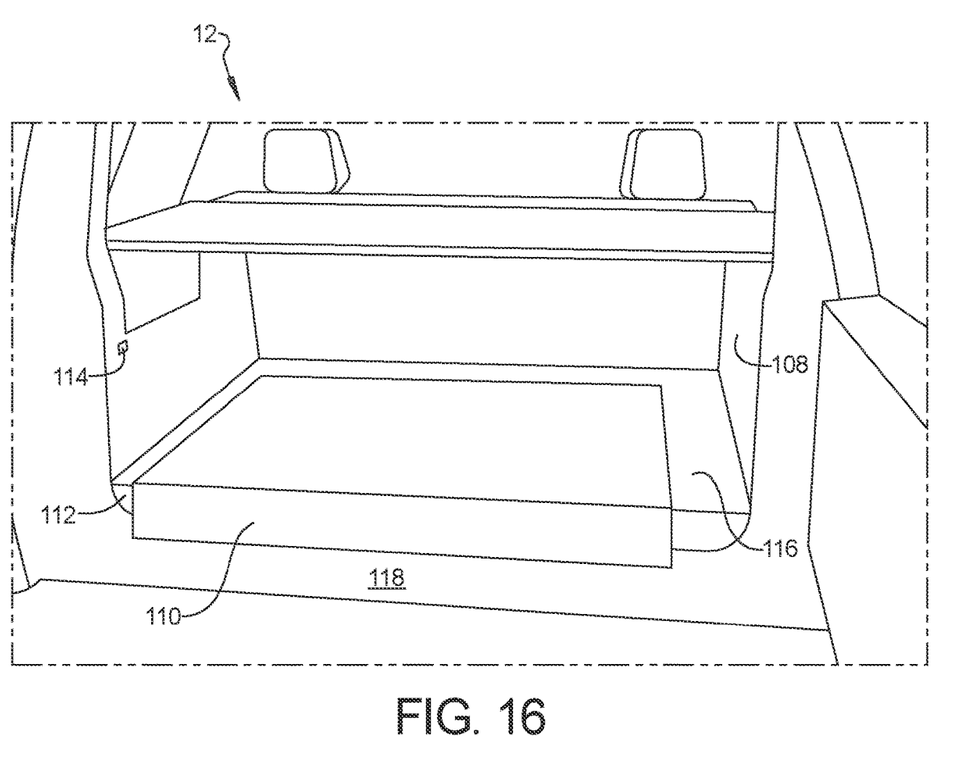
FIG. 16 is a rear perspective view looking forward of the automobile vehicle of FIG. 1.

Referring to FIG. 16 and again to FIGS. 1 through 15, any of the cargo mats of the present disclosure may also be releasably positioned within a rear storage area 108 of the automobile vehicle 12. A rear vertical wall 110 may be created using one of the cargo mats such as the cargo mat 18 when deployed in the rear storage area 108 to prevent cargo or items from falling out when a rear tailgate door (not visible in this view) is opened. Attachment members provided in the rear storage area 108 including a first rear attachment member 112 and a second rear attachment member 114 function similar to the forward counterparts, including the first attachment member 22 and the second attachment member 24 to releasably retain a cargo mat within the rear storage area 108. Similar to the configuration described in reference to FIG. 2, a cargo mat may be laid flat against a lower floor 116 of the rear storage area 108, and the cargo mat may also be extended above items stored within the rear storage area 108 similar to the configuration described in reference to FIG. 3. A rear cargo mat may also be connected and overlapped onto a rear fascia 118 of the automobile vehicle similar to the configuration described in reference to FIG. 4.

A flexible fascia protection, cargo retention, floor protection and storage system 10 of the present disclosure offers several advantages. These include a single, flexible, multi-use part or cargo mat of the present disclosure may replace what is currently provided as five separate parts to perform the following functions: 1) A combination fascia cover/bibb for either or both of a front frunk and a rear storage area of an automobile vehicle. The cover/bibb protects the fascia especially the front fascia when a large tire diameter creates high ride heights, requiring the customer to lift objects high to reach into the frunk or trunk; 2) A cargo mat acting as a floor liner may be extended across all or substantially all of a floor area of the frunk or the trunk; 3) A cargo mat acting as a cover may be extended over cargo in the frunk, or in the rear storage area to protect cargo from view and from environmental elements including for example protection of the cargo from rain while the frunk hood or rear hatch is open; 4) A cargo mat may be deployed as a vertical retaining wall configured so objects are prevented from rolling out of the automobile vehicle when the frunk hood or the trunk hatch is opened; and 5) A pouch releasably retaining a folded or stowed cargo mat may be provided that acts as both a storage volume for the cargo mat and as a retaining wall when installed in a vertical configuration across a width of the front frunk or the rear storage area (trunk) to prevent objects being released when the front hood or the rear hatch is opened.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:
1. A vehicle cargo mat system, comprising:
 a cargo mat configured to fit within a storage area of an automobile vehicle;
 multiple attachment members fixed to the automobile vehicle within the storage area;

multiple retention members connected to the cargo mat, the multiple retention members adapted to individually releasably connect to one of the multiple attachment members; and the cargo mat being configured to extend into at least four optional positions including: a first position extending across a width of the storage area at an outward facing end of the storage area; a second position having the cargo mat laid flat to substantially cover a lower floor of the storage area; a third position having the cargo mat extended over the storage area to cover objects temporarily stored within the storage area; and a fourth position having the cargo mat extended outward from the storage area to at least partially cover a fascia of the automobile vehicle.

2. The system of claim 1, wherein the multiple attachment members include a first attachment member, a second attachment member elevated above the first attachment member, a third attachment member horizontally opposed to the first attachment member, and a fourth attachment member horizontally opposed to the second attachment member proximate an outward facing end of the storage area.

3. The system of claim 2, wherein the cargo mat when in the first position is configured as a vertical wall positioned proximate to the outward facing end of the storage area and releasably connected to the first attachment member, the second attachment member, the third attachment member, and the fourth attachment member.

4. The system of claim 2, wherein the multiple attachment members further include a fifth attachment member and a sixth attachment member proximate a closed end of the storage area located opposite to the outward facing end and the first attachment member, the second attachment member, the third attachment member and the fourth attachment member.

5. The system of claim 4, wherein the cargo mat when in the third position has the cargo mat is releasably connected to the first attachment member and the third attachment member, is extended over the storage area and is releasably connected to the fifth attachment member and the sixth attachment member.

6. The system of claim 1, further including a pouch having the cargo mat positioned within the pouch when the cargo mat is in the first position.

7. The system of claim 6, wherein the cargo mat defines an accordion shape folded to fit within the pouch or attached to a body of the automobile vehicle end extended out of the pouch to extend to one of the second position, the third position or the fourth position.

8. The system of claim 1, wherein the attachment members define one of: fixed hooks and rings including D-shaped rings.

9. The system of claim 1, wherein the storage area defines one of a front storage area also defining a frunk, and a rear storage area also defining a trunk.

10. The system of claim 1, wherein the retention members define bungee hooks allowing flexible extension of the retention members to bias the cargo mat.

11. A system for flexible fascia protection, cargo retention, floor protection and storage, comprising:
a cargo mat of a flexible material configured to fit within a front storage area of an automobile vehicle;
multiple attachment members defining one of hooks or rings fixed to the automobile vehicle within the front storage area;
multiple retention members connected to the cargo mat, the multiple retention members adapted to individually releasably connect to one of the multiple attachment members; and
the cargo mat when releasably connected to at least two of the multiple attachment members is further configured into at least four optional positions including: a first position defining a vertical wall; a second position having the cargo mat laid flat to substantially cover a lower floor of the front storage area; a third position having the cargo mat extended over the front storage area to cover objects temporarily stored within the front storage area; and a fourth position having the cargo mat extended outward from the front storage area to at least partially cover a fascia of the automobile vehicle.

12. The system of claim 11, further including a pouch, wherein the cargo mat defines an accordion shape folded to fit within the pouch, the pouch defining the vertical wall with the cargo mat extended out of the pouch to achieve to one of the second position, the third position or the fourth position.

13. The system of claim 12, wherein the cargo mat includes multiple permanent flat segments separated by successive folding sections defining hinged joints.

14. The system of claim 13, wherein the at least two of the multiple attachment members include a first attachment member, a second attachment member elevated above the first attachment member, a third attachment member horizontally opposed to the first attachment member, and a fourth attachment member horizontally opposed to the second attachment member.

15. The system of claim 14, wherein the pouch includes a retention member connected to the pouch at each of four corners of the pouch, the retention member at each of the four corners individually releasably connected to one of the first attachment member, the second attachment member, the third attachment member and the fourth attachment member such that the vertical wall extends across a width of the front storage area proximate an outward facing end of the front storage area.

16. The system of claim 11, wherein predetermined ones of the retention members define bungee members releasably connected into openings created in the fascia, elastic displacement of the bungee members inducing tension to retain the cargo mat in the fourth position.

17. The system of claim 11, further including a reel having the cargo mat biased to be retracted into the reel and retractably extended from the reel to provide the second position, the third position and the fourth position.

18. A method to provide fascia protection, cargo retention, floor protection and storage for a vehicle, comprising:
configuring a cargo mat to fit entirely within a storage area of an automobile vehicle;
connecting multiple retention members to the cargo mat;
fixing multiple attachment members to the automobile vehicle to be accessible within the storage area;
releasably connecting individual ones of the multiple retention members to predetermined ones of the multiple attachment members; and
providing for at least four optional positions of the cargo mat including: a first position having the cargo mat extending as a vertical wall across a width of the storage area at an outward facing end of the storage area; a second position having the cargo mat laid flat to substantially cover a lower floor of the storage area; a third position having the cargo mat reaching over the storage area to cover objects temporarily stored within the storage area; and a fourth position having the cargo mat extended outward from the storage area to at least partially cover a fascia of the automobile vehicle.

19. The method of claim 18, further including releasably connecting a same two of the retention members to two of the predetermined ones of the multiple attachment members in each of the first position, the second position, the third position and the fourth position of the cargo mat.

20. The method of claim 18, further including configuring the storage area as one of a frunk area and a trunk area of the automobile vehicle with the cargo mat adapted to interchangeably fit within the frunk area and the trunk area.

* * * * *